United States Patent [19]

Tenhagen

[11] Patent Number: 4,595,565
[45] Date of Patent: Jun. 17, 1986

[54] EQUIPMENT FOR MIXING LIQUID REACTANTS

[75] Inventor: Rudolf J. Tenhagen, Longirod, Switzerland

[73] Assignee: BP Chemicals Limited, London, England

[21] Appl. No.: 645,482

[22] Filed: Aug. 29, 1984

[30] Foreign Application Priority Data

Aug. 31, 1983 [GB] United Kingdom ............... 8323321

[51] Int. Cl.$^4$ .............................................. B01F 5/04
[52] U.S. Cl. .................................... 422/133; 422/135; 422/224; 422/234; 251/63; 521/917; 137/896; 366/150; 366/173; 366/189
[58] Field of Search ............... 422/133, 135, 224, 234; 366/76, 77, 150, 173, 341, 137, 159, 177, 190, 189; 251/63; 261/DIG. 26; 521/917; 137/896, 897, 898, 886

[56] References Cited

U.S. PATENT DOCUMENTS 4,260,266  4/1981  Rudhart et al. ..................... 366/150
4,418,041 11/1983  Johnson et al. ..................... 422/133

Primary Examiner—S. Leon Bashore
Assistant Examiner—Andrew J. Anderson
Attorney, Agent, or Firm—Brooks Haidt Haffner & Delahunty

[57] ABSTRACT

A mixing head suitable for mixing two or more liquids is provided. During the mixing process, the liquids are first contacted in a zone of small dimensions in which turbulent mixing occurs and are then discharged into a zone of larger dimensions in which laminar flow is established. The two zones are so designed that there is a single piston operating in both zones and discharging the mixed product. The mixing head can be used to mix a polyol and a polyisocyanate during the formation of polyurethanes.

9 Claims, 8 Drawing Figures

VARIANT 1

VARIANT 2

VARIANT 3

VARIANT 4

EQUIPMENT FOR MIXING LIQUID REACTANTS

This invention relates to a mixer, sometimes referred to in the art as a mixing head, for mixing the liquid reactants, for example, polyol and isocyanate which are employed in the preparation of polyurethanes.

Mixers have been previously used in which the two liquids are passed separately through nozzles into a mixing zone in a cylinder from which the mixed liquids are discharged. At the end of the mixing the cylinder is emptied by the action of a piston.

A development from this mixer was to provide means for passing the two liquids into a zone where, on account of its dimensions and rates of flow, conditions of turbulence are created, the turbulence assisting in efficient mixing, and the zone of turbulence communicating with the cylinder whose dimensions are greater than those of the turbulent zone so that the mixture is discharged under more orderly conditions of flow. At the end of the mixing, the turbulent zone and the cylinder are emptied by the action of separate pistons. This arrangement is more complex than that mentioned above and involves controlling the action of the two pistons.

It is an object of the present invention to provide a simplified construction involving the action of only one piston and at the same time to obtain the benefit of both mixing under conditions of turbulence and a discharge from the cylinder under more orderly condtions of flow.

According to the present invention, therefore, there is provided a mixer for mixing two or more liquid streams comprising a cylinder in which the liquids are mixed and discharged from characterised in that the cylinder is of asymmetric cross section and consists of
  (a) a mixing zone of relatively small dimension, connected to two or more inlet nozzles and
  (b) a discharge zone of enlarged dimensions the liquids being mixed under turbulent conditions in the mixing zone before entering the discharge zone where discharge occurs under conditions of laminar flow.

According to another aspect of the invention there is provided a method of mixing two or more liquids characterised in that the liquids are brought into contact in a mixing zone of relatively small dimensions, allowed to mix under turbulent conditions and to pass into a discharged zone of enlarged dimensions, in which the flow is essentially laminar and subsequently discharged from the discharge zone.

The shape of both the discharge zone and mixing zone can be varied considerably and four variants are shown in FIGS. 1(a)-(d) of the drawings. The only limit on the dimensions of the two zones is that the mixing zone should have a smaller cross-sectional area than the discharge zone.

Although the cylinder of asymmetric cross section may be constructed so that one mixture is produced and discharged, it is possible to design the head so that more than one mixture can be prepared and discharged. This can be particularly useful when preparing polyurethane foams where it is desirable to discharge different foam formulations sequentially. In such a situation the head is designed so as to have the discharge zone disposed centrally in the head connected to two or more mixing zones each connected to its appropriate set of reactants.

The mixture in the cylinder is preferably discharged by the reciprocating action of a piston operating within both the mixing and discharge zones of the cylinder. The reciprocating motion of the piston may be created by any standard means.

The invention is illustrated by the accompanying drawings in which:

FIGS. 1(a) through (d) illustrate in fragmentary, plan views, partly in cross-section, of four possible variants for the mixing and discharge zones;

Figure 3:
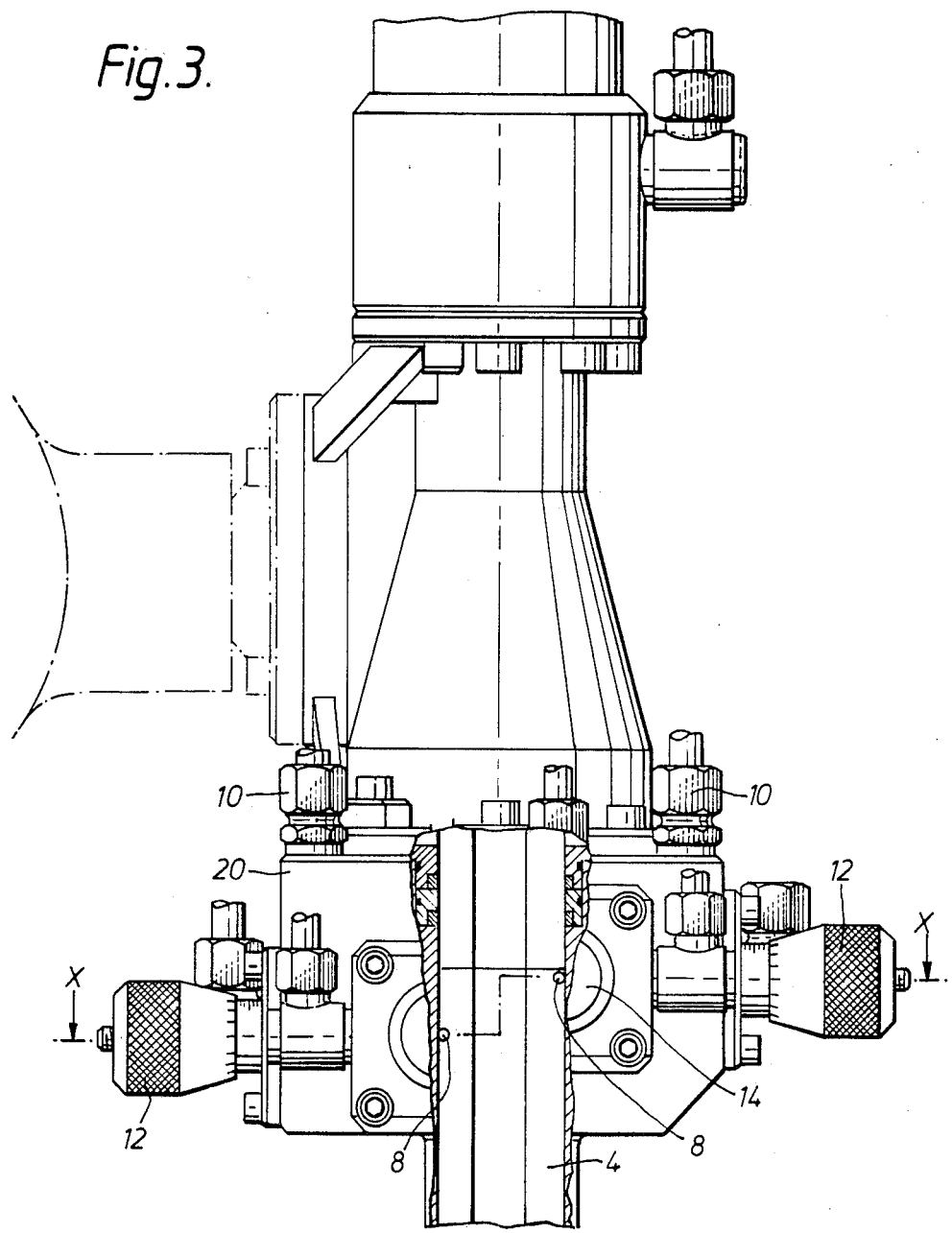
FIG. 3 is a side elevation view similar to FIG. 2 but takes at right angles to the view shown in FIG. 2.
Figure 4:
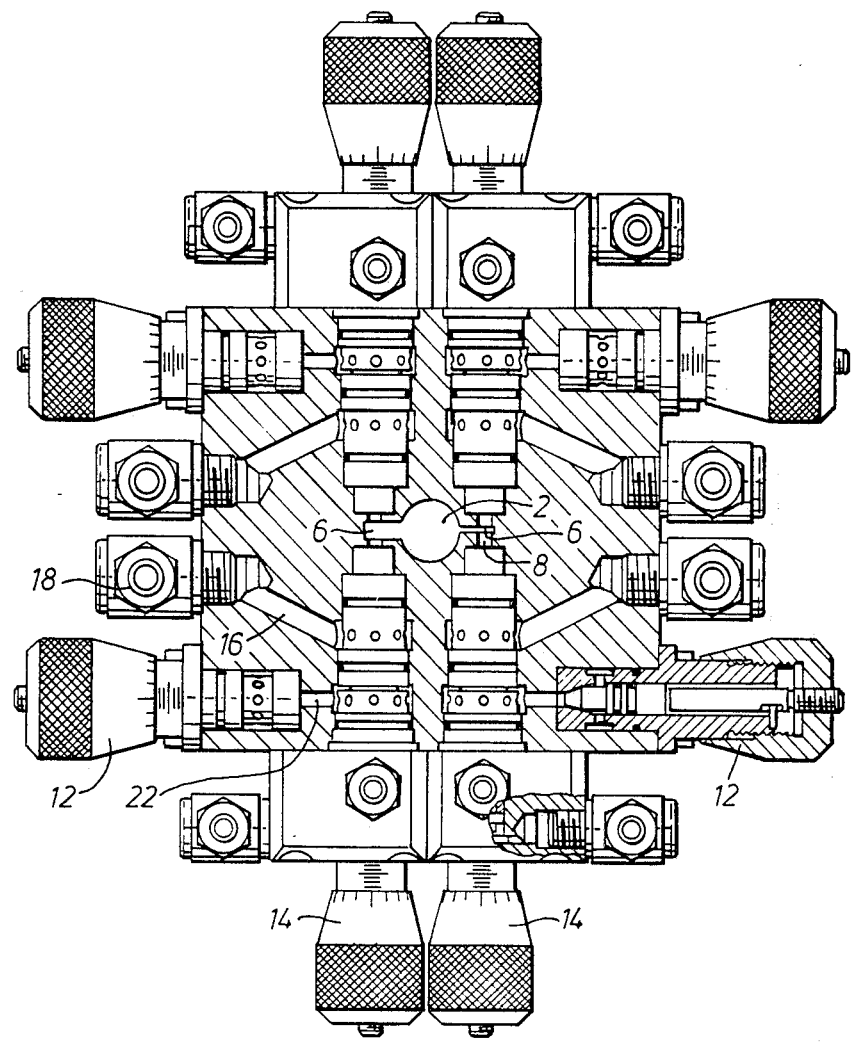
FIG. 4 is a partly cross-sectional view of the mixing head shown in FIGS. 2 and 3 and is taken along the line X—X indicated in FIG. 3; and FI. 5 is similar to FIG. 2 and shows the discharge piston in its position when the head is being filled.

Referring to the Figures the cylinder comprises a discharge zone (2) (FIG. 4) of circular cross section connected to two mixing zones (6) of rectangular cross section disposed on opposite sides of the discharge zone (2). Each mixing zone is connected by a pair of inlet nozzles (8), (FIGS. 3 and 4), disposed opposite each other, to the sources of the two liquids to be mixed. In the case where the head is used to produce a polyurethane foam, the two inlet nozzles (8) would repsectively act as inlets for an isocyanate and a polyol.

The embodiment illustrated in the Figures allows precise control of the flow of each liquid through the appropriate inlet nozzle (8). Each liquid is fed into he head from an external reservoir by means of coupling (10) (FIG. 3) located in the top of the cylinder block (20) above valve (12). The liquid passes through valve (12) and into tube (22) (FIG. 4) which connects with a second valve (14). Valve (12) controls the overall rate of liquid flowing into the head. The liquid leaving valve (14) has two possible exits, the first at the end of the valve which connects with the inlet nozzle (8) and the second at an intermediate point which connects with an exit pipe (16) and an exit coupling (18). Valve (14) is used to adjust the relative amounts of flow through the inlet nozzle (8) and the exit pipe (16) thereby allowing the flow into the inlet nozzle to be finely ajusted.

Figure 1A:
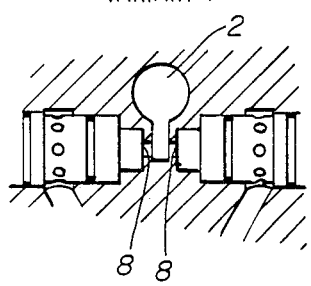
Figure 1B:
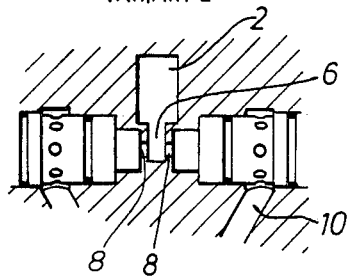
Figure 1C:
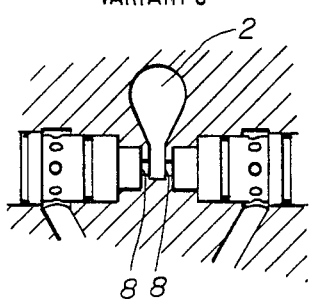
Figure 1D:
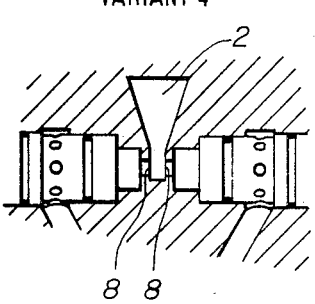
Figure 2:
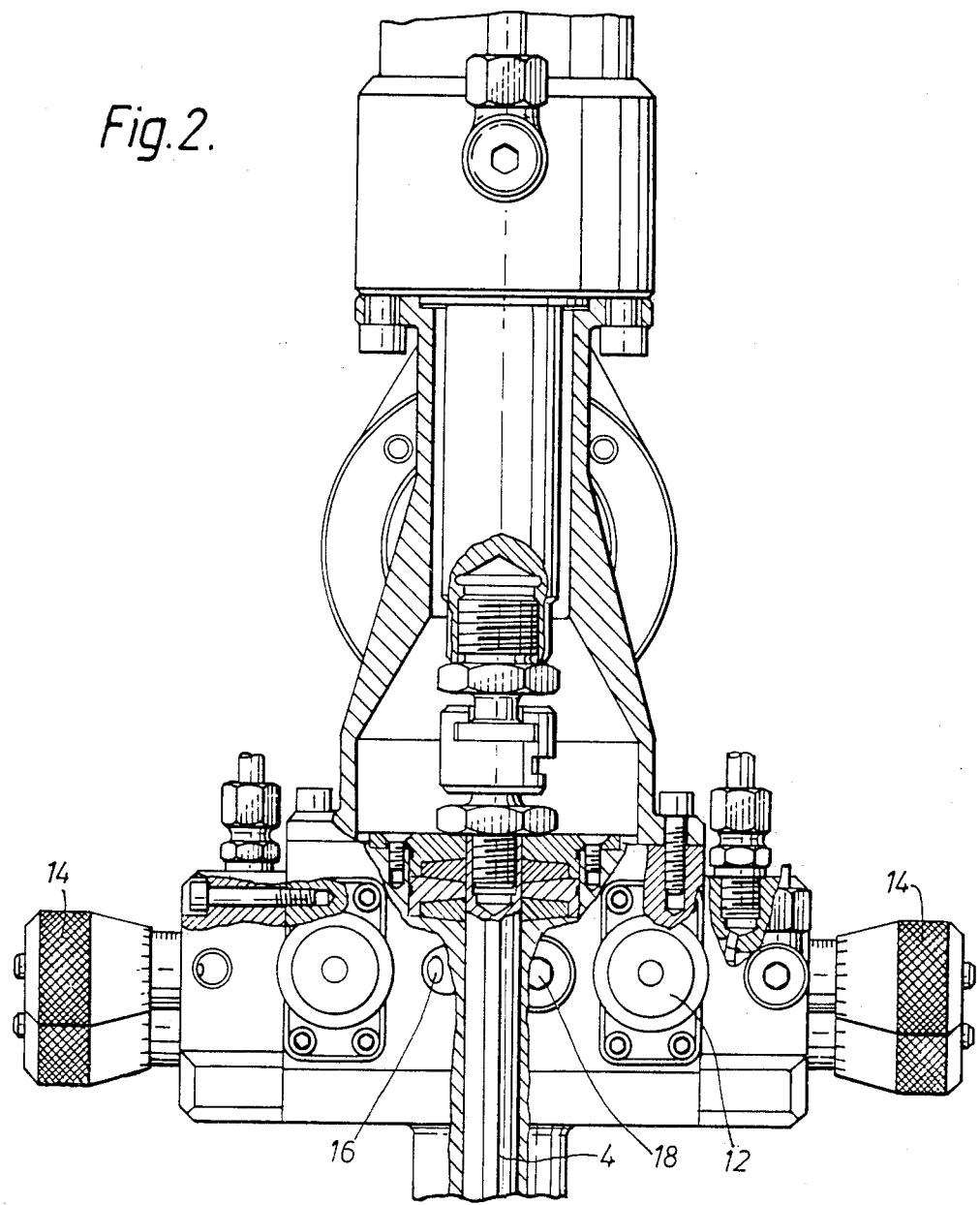
FIG. 2 is a side elevation view, partly in cross-section, of a portion of the mixing head of the invention with the discharge piston in its discharge position.
Figure 5:
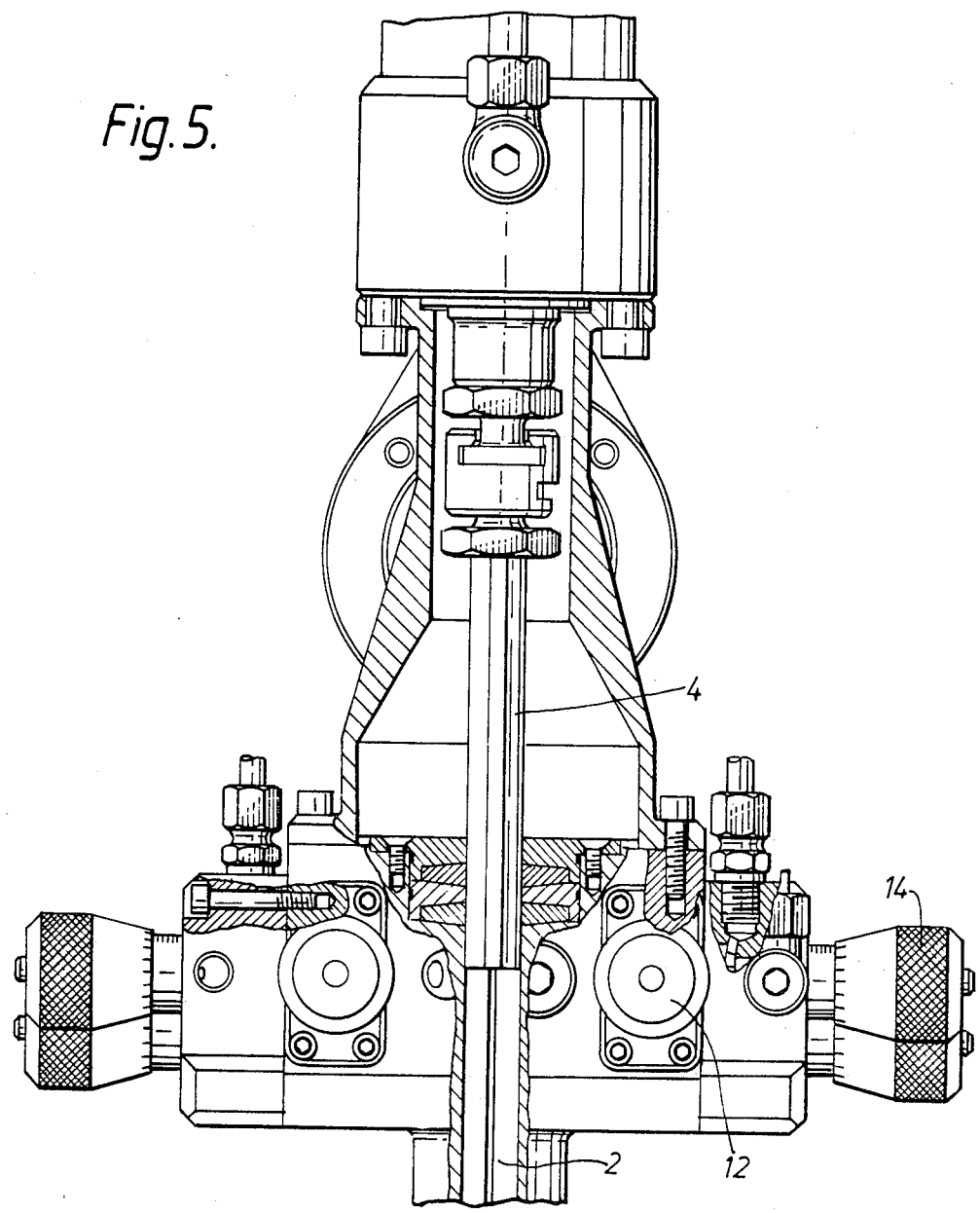

Working within the whole cylinder, in both mixing and discharge zones (6) and (2), is a piston (4) (FIGS. 2 and 3), moving in a reciprocating manner, and producing in the mixer, a series of fill/discharge cycles. In the first part of the cycle the piston (4) is at its highest point (FIG. 5) and the cylinder in the vicinity of the inlet nozzles is open. At this point liquids flow into the mixing zone or zones (6), via two or more of the inlet nozzles (8), where mixing under turbulent conditions occurs. The mixture is forced into the discharge zones (2) where, as a consequence of the increased cross sectional area, it slows down to a flow which is essentially laminar. As the piston moves from its highest point downwards it begins to fill both the mixing zone (6) and discharge zone (2), closes the inlet nozzles and hence stops ingress of liquid into the mixing zone. The mixture present in the mixing and discharge zones is at the same time forced out of the bottom of the cylinder into an appropriate recepticle or mould. At its lowest point the piston has forced all the liquid out of the cylinder (2). The piston then moves back to its highest point where the cycle starts again.

When an inlet nozzle (8) is closed by the piston (4) liquid is still able to flow through the valves (12) and

(16) but in this position all the liquid leaves via pipe (16). By this means it is possible to ensure that all the valves are purged with liquid continually thereby preventing the build up of material which could block the valves or associated pipework.

As shown in FIGS. 2–5 the valves (12) and (14) have micrometer type adjustment means to allow the flow rates to be set and maintained in a reproducible manner.

As regards the two mixing zones (6) these run continuously down the length of the cylinder as does the discharge zone. It is convenient to locate the inlet nozzles (8) so that each set of the nozzles (8) associated with a particular mixing zone does not lie in the same horizontal plane as any other set.

I claim:

1. A mixing head for mixing two or more liquids, said mixing head comprising:
   a cylinder having two portions of different cross-sectional areas interconnected for liquid flow therebetween and having a delivery end, one of said portions having a smaller cross-sectional area than the other of said portions and defining a mixing zone and the other of said portions having a larger cross-sectional area and defining a discharge zone;
   nozzles, one for each of the liquids, connected to said one of said portions of said cylinder for supplying said liquids to said mixing zone; and
   a reciprocable piston mounted in said cylinder for reciprocation toward and away from said delivery end of said cylinder, said piston having a cross-section substantially equivalent to that of the combined mixing and discharge zones operable in both zones for the discharge of the mixed liquids whereby movement of said piston toward said delivery end causes removal of mixed said liquids from both portions of said cylinder.

2. A mixing head as claimed in claim 1 wherein said one of said portions has a rectangular cross-section and said other of said portions has a circular cross-section.

3. A mixing head as claimed in claim 1 wherein both of said portions have non-circular cross-sections.

4. A mixing head as claimed in claim 1 wherein said one of said portions has a rectangular cross-section and said other of said portions has a triangular cross-section.

5. A mixing head as claimed in claim 1 wherein said one of said portions has a rectangular cross-section and said other of said portions has a rectangular cross-section.

6. A mixing head as claimed in claim 1 wherein said cylinder further comprises a third portion having a cross-sectional area smaller than said other of said portions and defining a further mixing zone, said third portion being disposed in circumferentially spaced relation to said one of said portions, wherein nozzles, one for each liquid to be mixed in said third portion, are connected to said third portion for supplying liquids to said third portion and wherein said piston has a cross-section substantially equivalent to that of the combination of all three of the portions of said cylinder operable to discharge mixed liquids from all three portions.

7. A mixing head as claimed in claim 1 further comprising a valve connected to each nozzle for controlling the flow of liquid through each nozzle and having an outlet extending to the exterior of said mixing head for permitting liquid to flow through said valve when the nozzle to which it is connected is obstructed.

8. A mixing head as claimed in claim 7 wherein said valve is adjustable for adjusting the flow of liquid through each nozzle.

9. A mixing head as claimed in claim 1 wherein the nozzles connected to a portion of said cylinder having a smaller cross-sectional area are disposed at positions spaced with respect to each other in the direction of the longitudinal axis of said cylinder.

* * * * *

UNITED STATES PATENT AND TRADEMARK OFFICE
CERTIFICATE OF CORRECTION

PATENT NO. : 4,595,565

DATED : June 17, 1986

INVENTOR(S) : Tenhagen

It is certified that error appears in the above-identified patent and that said Letters Patent is hereby corrected as shown below:

Col. 2, line 31, "he" should read --the--;

Claim 7, line 1, "claim 1" should read --claim 1 or claim 6--;

Claim 9, line 1, "claim 1" should read --claim 1 or claim 6--.

Signed and Sealed this

Seventh Day of October, 1986

[SEAL]

Attest:

DONALD J. QUIGG

Attesting Officer

Commissioner of Patents and Trademarks